United States Patent
Zuber et al.

(10) Patent No.: US 8,280,548 B2
(45) Date of Patent: Oct. 2, 2012

(54) OPTIMIZING VEHICLE LOADING OPERATIONS

(75) Inventors: Jacek Zuber, Heidelberg (DE); Amar Kumar, Wieslech (DE); Arno D. Bruns, Walzbachtal (Jöhlingen) (DE)

(73) Assignee: SAP Aktiengeselleschaft, Walldorf (DE)

( * ) Notice: Subject to any disclaimer, the term of this patent is extended or adjusted under 35 U.S.C. 154(b) by 714 days.

(21) Appl. No.: 11/794,112

(22) PCT Filed: Dec. 29, 2004

(86) PCT No.: PCT/EP2004/053727
§ 371 (c)(1),
(2), (4) Date: Dec. 2, 2008

(87) PCT Pub. No.: WO2006/069601
PCT Pub. Date: Jul. 6, 2006

(65) Prior Publication Data
US 2009/0216366 A1  Aug. 27, 2009

(51) Int. Cl.
*G06F 7/00* (2006.01)
(52) U.S. Cl. .................................................. 700/215
(58) Field of Classification Search .................. 700/215, 700/217, 218, 219, 224, 225, 226
See application file for complete search history.

(56) References Cited

U.S. PATENT DOCUMENTS

| | | | |
|---|---|---|---|
| 6,325,586 B1* | 12/2001 | Loy | 414/281 |
| 6,437,272 B2* | 8/2002 | Tamamoto et al. | 209/584 |
| 2002/0138172 A1* | 9/2002 | Bahri et al. | 700/217 |
| 2003/0060924 A1* | 3/2003 | Ye et al. | 700/217 |
| 2004/0199285 A1* | 10/2004 | Berichon et al. | 700/225 |
| 2005/0192701 A1* | 9/2005 | Ben-Ezra | 700/213 |

* cited by examiner

*Primary Examiner* — Ramya Burgess
(74) *Attorney, Agent, or Firm* — Blakely, Sokoloff, Taylor & Zafman LLP

(57) ABSTRACT

Computer-implemented method of loading goods stored in a warehouse on a vehicle for transporting and delivering to a number of destination locations, whereby the destination locations are on a predetermined route, comprising the following steps: receiving a number of delivery requests, each request specifying the goods to be delivered, and the destination locations of the goods to be delivered; receiving data descriptive of the route which the vehicle has to travel for delivering the goods at the destinations; placing the goods to be delivered on a staging area associated with the vehicle, the staging area defining a physical place where the goods are intermediately put down and sequentially picked up from for being loaded on the vehicle; whereby the goods are positioned on the staging area in such a first spatial sequence that they can be picked up there from and placed in the vehicle in such a second spatial sequence that they can be unloaded from the vehicle at the respective destination locations in the sequence of arriving at the destination locations.

20 Claims, 5 Drawing Sheets

OPTIMIZING VEHICLE LOADING OPERATIONS

This is a non-provisional application of International Application No. PCT/EP2004/053727, filed Dec. 29, 2004.

BACKGROUND OF THE INVENTION

This application relates to optimizing vehicle loading operations.

Efficiently loading goods onto transportation vehicles at a warehouse can be a complex problem, especially if goods are to be transported to a large number of locations with one vehicle on a single trip.

Typically, the goods are taken out from the warehouse by one person and placed somewhere in a staging zone near the rear side of the vehicle which is designated to transport the goods. The goods are then picked up and loaded onto the vehicle by the same or another person.

Before reaching their respective ultimate destinations, the goods may be unloaded at an intermediate location, and again loaded onto another means of transport for being shipped towards the destination. These operations may be repeated several times until the goods reach their ultimate destinations.

If the vehicle is not loaded efficiently, unloading the vehicle at the ultimate destination may become complicated especially if the vehicle has only one door, and the goods are loaded such that they are not directly accessible at any time.

A problem arises when there are several goods which have to be transported to several different locations with one vehicle.

In that case, it is of importance how the goods are positioned in the vehicle.

SUMMARY OF THE INVENTION

In general, in one aspect, this invention provides methods and apparatus, including computer program products.

The present invention allows selecting alerts from connected applications, to process them, and to send alert notification messages to the intended recipients.

In one aspect, the invention provides a computer-implemented method of loading goods stored in a warehouse on a vehicle for transporting and delivering to a number of destination locations, wherein the destination locations are on a predetermined route, the method comprising:
  receiving a number of delivery requests, each request specifying
    the goods to be delivered, and
    the destination locations of the goods to be delivered;
  receiving data descriptive of the route which the vehicle has to travel for delivering the goods at the destinations;
  placing the goods to be delivered on a staging area associated with the vehicle, the staging area defining a physical place where the goods are intermediately put down and sequentially picked up from for being loaded on the vehicle;
  whereby the goods are positioned on the staging area in such a first spatial sequence that they can be picked up there from and placed in the vehicle in such a second spatial sequence that they can be unloaded from the vehicle at the respective destination locations in the sequence of arriving at the destination locations.

Advantageous implementations can include one or more of the following features.

The staging area may be divided into a spatial sequence of staging bays, each staging bay corresponding to a destination location such that goods to be delivered at a destination are placed on the corresponding staging bay.

Hereby, one staging bay may correspond to several destination locations.

On the other hand, several staging bays may correspond to one destination location.

The second spatial sequence may be equal to the first spatial sequence. Alternatively, the second spatial sequence may be inverted with respect to the first spatial sequence.

The staging area may be organized according to the LIFO principle. Alternatively, the staging area may be organized according to the FIFO principle.

The staging area may be located spatially between the warehouse and a loading area for the vehicle of transport.

The method may further comprise:
  partitioning the route in a number of legs, each leg defining a segment of the route on which the good is transported on one transport means;
  for all legs,
    associating with each stop on the leg a unique ID, the ID being representative of a destination location on the leg;
    the IDs having an order which is descriptive of the sequence of the destination locations on the leg;
    based on the order of the IDs, determining the spatial sequence in which the goods are to be put down on the staging area.

Herein, the first spatial sequence may be the same as the order of the IDs. Alternatively, the first spatial sequence may be inverted with respect to the order of the IDs.

Hereby, the number of times which the order of the goods is inverted at the ends of a legs of the routes may be further taken into account.

The route may be a fixed trip. The vehicle may a fixed-trip vehicle having a predetermined route to travel.

In particular, the invention comprises also computer systems for performing the inventive methods.

Furthermore, the invention comprises computer-readable storage media comprising program code for performing the inventive methods, when loaded into a computer system.

The optimization of unloading the vehicle at the destinations of a given shipment is based on the determination of the staging bay and loading of the truck at the warehouse in a sequence given by the position the goods on the staging bays.

One of the advantages of the invention is that transport process is optimized in such a way that unloading the goods at their respective destination locations can be performed much easier and much faster.

BRIEF DESCRIPTION OF DRAWINGS

The accompanying drawings, which constitute a part of the specification, illustrate embodiments of the invention, and may serve in connection with the description to explain principles of the invention.

In the drawings.

DETAILED DESCRIPTION

Figure 1:
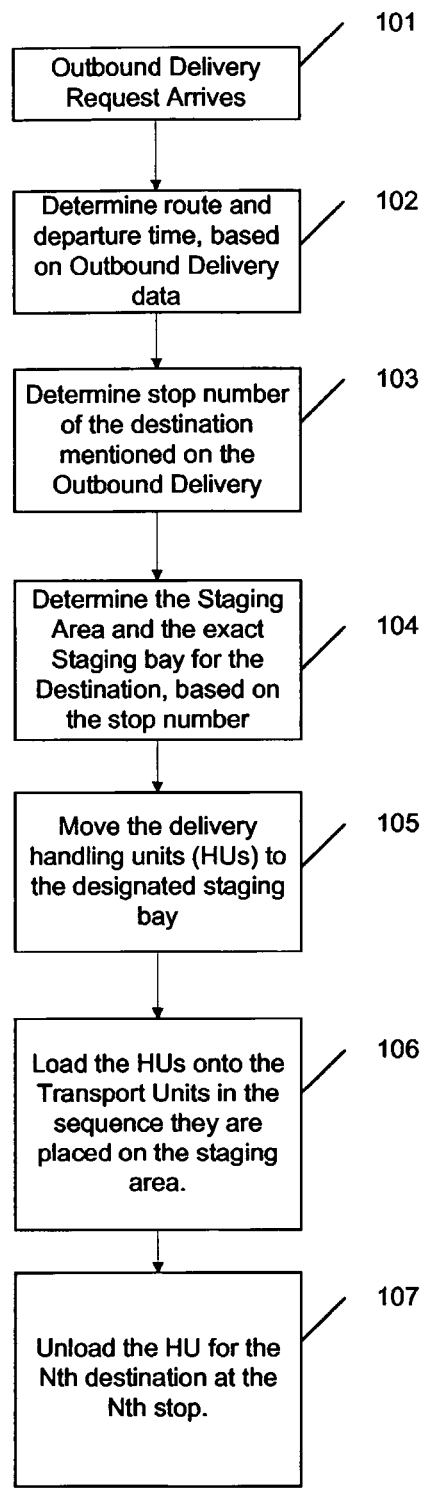
FIG. 1 gives an overview of the process of loading/unloading a vehicle.

The overall-process of loading and (afterwards) unloading a vehicle can be illustrated as given in FIG. 1. According to FIG. 1, an outbound delivery request is received at step 101. Then, the vehicle, the route, and the departure time are determined, on the basis of outbound delivery data, at step 102.

In step 103, the stop number of each one of the destination locations is determined. In step 104, the staging area and the exact staging bay for the respective destination location are determined. Then in step 105, the goods (in general: handling unit, HU) are moved from the storage location in the warehouse to the previously determined staging bays. There from, the goods are loaded into the vehicle in the correct sequence as presented at the staging area.

The vehicle loaded in such a way is then moving towards to the destinations locations, step 107. At each destination location (i.e., stop on the route), the respective good can be unloaded directly, i.e., without further unloading and re-loading other goods than the concerned one.

Steps 103 to 106 are developed in more detail in the following.

Figure 2:
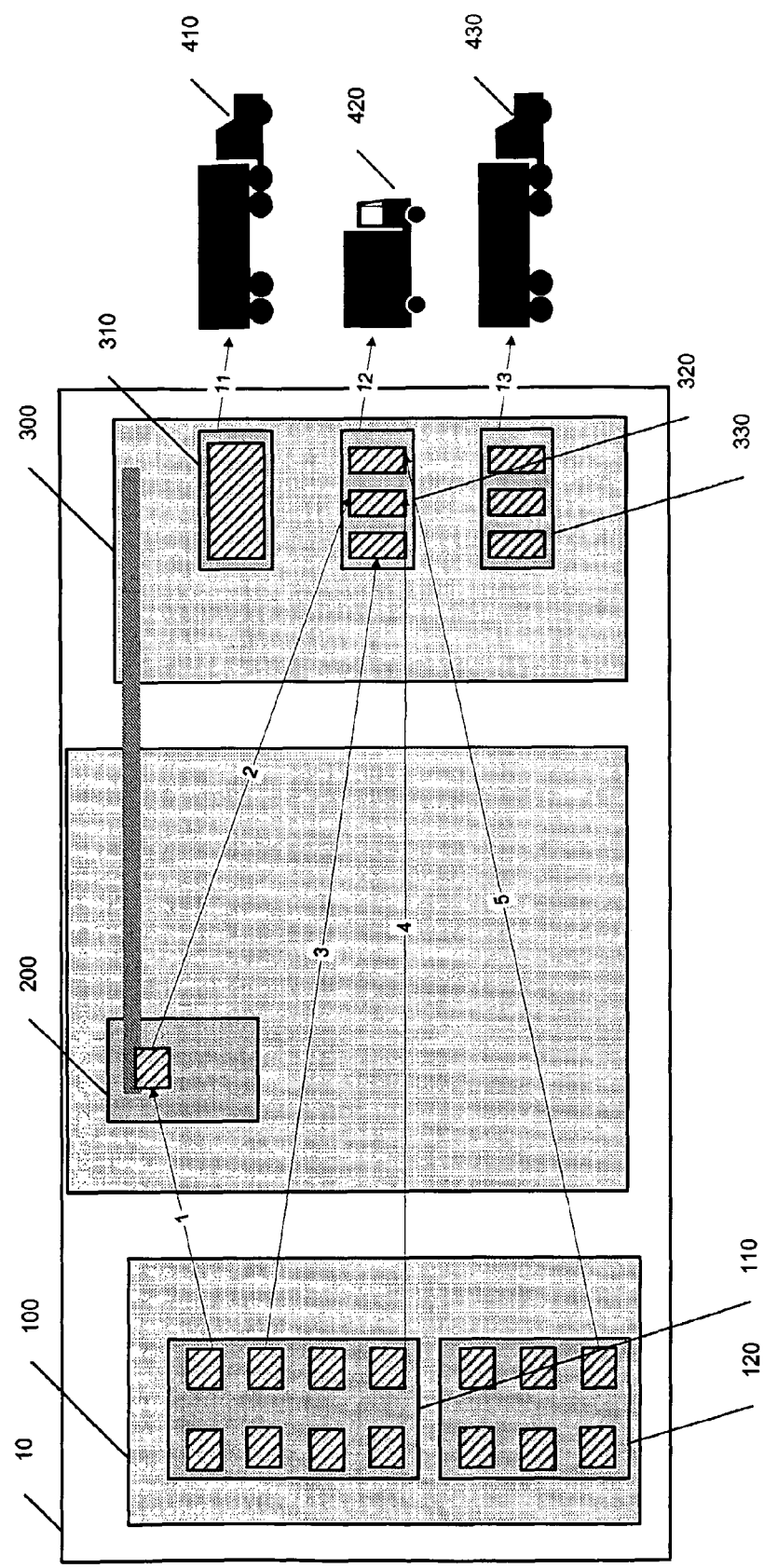
FIG. 2 illustrates a symbolic layout of a warehouse.

FIG. 2 shows a symbolic layout of a warehouse 10 which comprises an area 100 where the goods are stored, e.g., racks 110, 120, or other kinds of storage spaces (not shown). In a further area of the warehouse, packaging facilities 200 may be provided where the goods are packed for the transport if necessary. In a further zone 300, staging areas 310, 320, 330 are arranged. A staging area is a physical space in the warehouse, generally near to the warehouse doors, to prepare goods before loading them through the doors into vehicles (e.g., truck, tractor-trailer) 410, 420, 430, which are close to the staging bays.

In general, all the goods which are to be loaded onto one vehicle are placed on one staging area. Therefore, the staging area 310 is associated with the one vehicle 410 at a time. However, depending on the volume of freight to be shipped by one vehicle, more than one staging area may be associated with one vehicle at a time.

Figure 4:
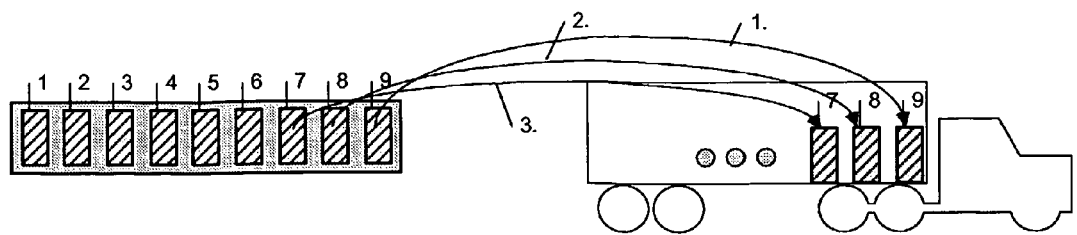
FIG. 4 illustrates the LIFO principle of loading/unloading a vehicle.
Figure 5:
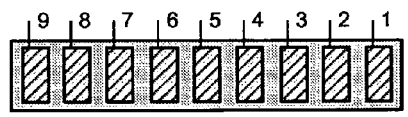
FIG. 5 illustrates the FIFO principle of loading/unloading a vehicle.

According to the invention, each staging area 310, 320, 330 is divided into several staging bays 1, 2, 3, ..., 9 (FIGS. 4 and 5). These staging bays define positions where the goods are put down exactly such that they can be picked up sequentially and loaded into the vehicle at the right place such that they can be unloaded in the sequence the vehicle arrives at the respective destination locations. Loading a vehicle in such a way avoids unloading and re-loading the vehicle partially if goods are not directly accessible at a given location on the route.

As an example, if the vehicle has only one door through which its loading area is accessible, the staging area is used such that goods which should be unloaded from the vehicle first, are placed on the bay furthest away from the vehicle's door. In this way it is assured that the loader can take the goods sequentially from the staging bays.

Thus, the goods are placed in the designated staging bay such that the loader of the vehicle has to simply load the goods nearest to the door first and the furthest goods last. The goods first loaded are placed in the front of the loading area of the vehicle whereas the last goods loaded are placed backmost on the loading area. Loading the vehicle in this way ensures that the goods which are first to be unloaded (i.e., at the first stop) can be accessed directly, without the need to unload other goods.

In the same way, the goods to be delivered to the second destination on the route can be directly accessed at the next stop.

It is to be understood that one staging bay may be designated to several stops (destination locations), in particular consecutive stops. On the other hand, several staging bays may be designated to one stop (destination location).

Figure 3:
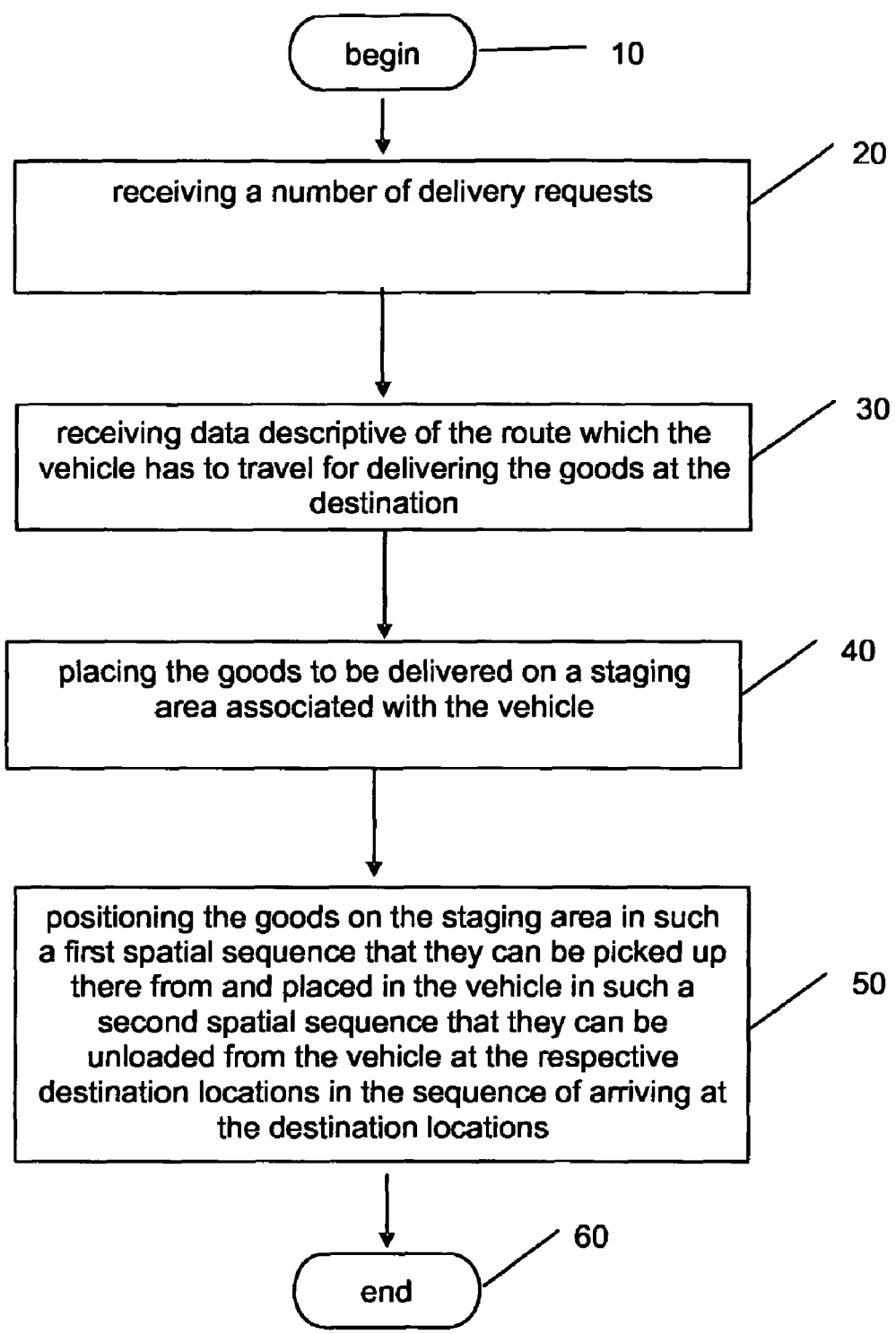
FIG. 3 illustrates the method of loading a vehicle according to one embodiment of the present invention.

FIG. 3 illustrates the steps of the computer-implemented method of loading a vehicles according to the invention. The method begins with step 10. In step 20, a number of delivery requests are received. Each delivery request specifies at least one good to be delivered, and the destination locations of the respective good.

In a next step, the means of transport for delivering the goods are determined, as described above in connection with FIG. 1. In the following, it is assumed that for all the goods specified by the number of requests, one vehicle is determined for transport. In step 30, data is received which is descriptive of the route the vehicle has to travel for delivering the goods. The route is such that the vehicle reaches all the destinations.

In step 40, the goods are placed on a staging area associated with the vehicle of transport. Within the staging area, the goods are positioned in such a first spatial sequence that they can be picked up there from and placed in the vehicle in such a second sequence that they can be unloaded from the vehicle, step 50. With step 60, the method ends.

The placement of the goods in the vehicle is such that they can be unloaded at the respective destination locations in the sequence of arriving at the destination locations.

As an example for the first and second sequence, if the vehicle has one door through which the goods are loaded and unloaded, the first sequence is equal to the second sequence, i.e., the order of the goods on the staging area is the same as the order in the vehicle, see FIG. 4. In this case, the vehicle is loaded according to the LIFO (last in-first out) principle, as illustrated in the Figure. The good to be unloaded last (labeled 9) is placed in the front of the trailer, thus loaded first. The good which is to be delivered at the first destination (labeled 1) is loaded last, thus just behind the door in the rear of the trailer.

In another case, if the vehicle has one door for loading and one door for unloading (which is at the other end of the loading area), the vehicle would be loaded/unloaded according to the FIFO (first in-first out) principle. In that case, the second spatial sequence is inverted with respect to the first spatial sequence, see FIG. 5.

Figure 6:
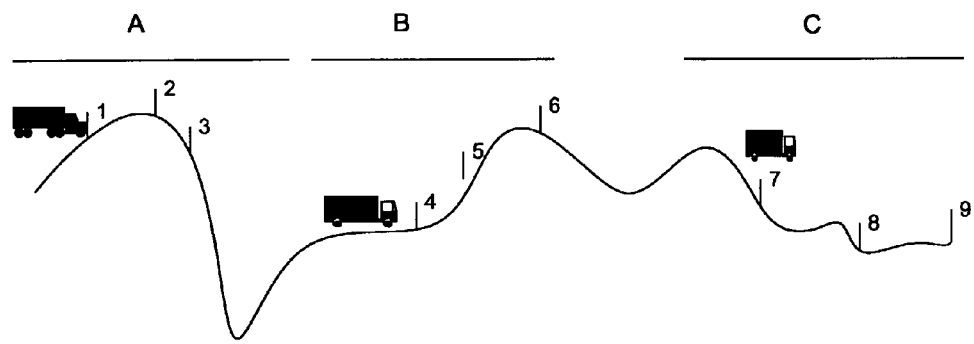
FIG. 6 illustrates a route comprising several segments.

The determination of the first spatial sequence i.e., the respective bay 1, 2, ..., 9 for the goods on the staging area may be more complex if the vehicle is changed one or more times during the trip to the destinations, see FIG. 6. Then, there may be an additional unloading/loading process at each location where the vehicle is changed. Since with each unloading/loading process an inversion of the sequence in the vehicle may be incurred, these unloading/loading processes may be taken into account when determining the first spatial sequence at the initial loading site, i.e., at the warehouse.

For dealing with that situation, an algorithm is proposed to determine the first spatial sequence. First, the complete route as received by the route determination program is partitioned into segments (legs) A, B, C on which one vehicle is driving. In FIG. 6, on the first segment (labeled A), there is a large tractor-trailer raveling while on the second segment B a normal-sized truck and the third segment C, a small truck are traveling.

Figure 7:
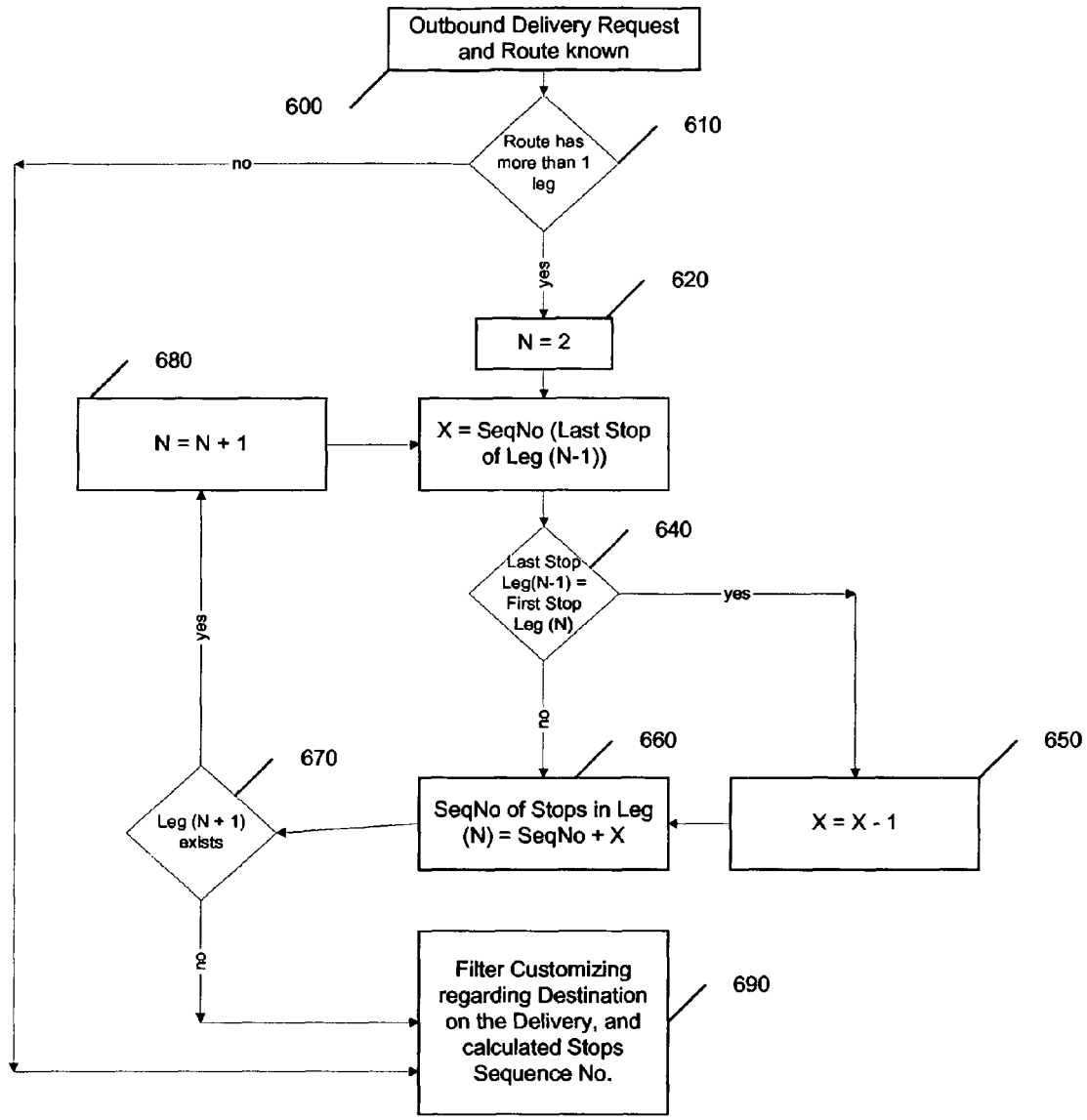
FIG. 7 illustrates an algorithm of partitioning the route.

For all the segments (legs) A, B, C, the steps of the process according to FIG. 7 are performed. The process is applied for associating unique numbers with each actual stop on the complete route (comprising all the legs) where a good is to be delivered. With each stop (i.e., destination location for a good to be delivered) on the respective leg where a good is unloaded, a unique ID is associated. All the IDs of the legs have an order which is descriptive of the sequence of the respective destination locations on the segment of the route. Thus, after application of this process, the sequence of stops correspond to a sequence of increasing numbers, beginning with 1, and ending with M, where M is the total number of stops.

Again in FIG. 6, on segment A, the first stop may get an ID 1 associated, the second stop 2, and the last stop 3. On segment B, the first intermediate stop is labeled 4, and the last stop is labeled 6. On segment C, the numbering of the stops is similar to that of the first leg, i.e., the begin gets an ID of 7, the intermediate stop an ID of 8, the end stop an ID of 9. Then, the first spatial sequence is determined based on the IDs associated with the stops on the route.

Several modifications of the algorithms are provided. The first sequence may have to be inverted if there is an inversion of the sequence of the goods at a stop at the end of a segment, due to a different way of loading/unloading a transport means.

At the end of each segment, there may be an unloading/loading process, where the goods are unloaded from the one vehicle and loaded into another vehicle.

The route which the vehicle travels along may be fixed for that vehicle ("fixed-trip"), or may be determined in each case. If it is a fixed trip, every staging bay of a staging area may be associated permanently with a given stop on the route. If a respective stop is not to be deserved on a particular trip, the corresponding staging bay will remain void.

On the other hand, if the route is determined individually for each trip, the actual association of the staging bays is determined for each trip again. It is to be noted that for the determination of the route, there may be used known methods and algorithms.

If there are several vehicles necessary for transporting the goods specified in the number of requests, the goods are divided among several vehicles for transport, and the step of determining a route is performed for every vehicle, as well as the staging bay determination steps described above.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A computer-implemented method comprising:
receiving a plurality of delivery requests, each delivery request specifying goods to be delivered, and destination locations of the goods to be delivered;
receiving data descriptive of a route which a vehicle will travel to deliver the goods to the destination locations;
creating, by a computer system, a plan for the placement of the goods on a staging area associated with the vehicle, the plan defining a first spatial sequence in which the goods are to be placed in the staging area, the staging area defining a physical place where the goods are intermediately put down and sequentially picked up from to be loaded on the vehicle;
wherein the goods are to be positioned on the staging area in the first spatial sequence such that they can be sequentially picked up there from and sequentially placed in the vehicle in a second spatial sequence that permits direct access to the goods in the vehicle for unloading from the vehicle at the respective destination locations in the sequence of arrival at the destination locations.

2. The method of claim 1, wherein creating, by the computer system, the plan for the placement of the goods on the staging area associated with the vehicle comprises:
dividing the staging area into a spatial sequence of staging bays, each staging bay corresponds to a destination location such that goods to be delivered at a destination are placed on the corresponding staging bay.

3. The method of claim 2, wherein one staging bay corresponds to several destination locations.

4. The method of claim 2, wherein several staging bays correspond to one destination location.

5. The method of claim 1, wherein the second spatial sequence is equal to the first spatial sequence.

6. The method of claim 1, wherein the second spatial sequence is inverted with respect to the first spatial sequence.

7. The method of claim 1, wherein the staging area is organized according to the LIFO principle.

8. The method of claim 1, wherein the staging area is organized according to the FIFO principle.

9. The method of claim 1, wherein creating, by the computer system, the plan for the placement of the goods on the staging area associated with the vehicle comprises:
partitioning the route in a plurality of legs, each leg defining a segment of the route on which the good is transported on one transport;
then for all legs:
associating with each stop on the leg a unique ID, the ID being representative of a destination location on the leg;
the IDs having an order which is descriptive of the sequence of the destination locations on the leg; and
based on the order of the IDs, determining the first spatial sequence in which the goods are to be put down on the staging area.

10. The method of claim 9, wherein the first spatial sequence is the same as the order of the IDs.

11. The method of claim 9, wherein the first spatial sequence is inverted with respect to the order of the IDs.

12. The method of claim 9, further comprising:
inverting a staging order for goods inverted at an end of a leg of a route.

13. The method of claim 1, wherein the route is a fixed trip.

14. The method of claim 1, wherein the vehicle is a fixed-trip vehicle having a predetermined route to travel.

15. A non-transitory machine readable storage medium having instructions therein that when executed by the machine cause the machine to:
receive a plurality of delivery requests, each delivery request specifying goods to be delivered, and destination locations of the goods to be delivered;
receive data descriptive of a route which a vehicle will travel to deliver the goods at the destination locations;
define a plan for the placement of the goods on a staging area associated with the vehicle, the staging area defining a physical place where the goods are intermediately put down and sequentially picked up from to be loaded on the vehicle;
wherein the goods are to be positioned on the staging area in a first spatial sequence, the first spatial sequence defined by the plan, such that they can be sequentially picked up there from and sequentially placed in the vehicle in a second spatial sequence that permits direct access to the goods in the vehicle for unloading from the vehicle at the respective destination locations in the sequence of arrival at the destination locations.

16. The non-transitory machine readable storage medium of claim 15, having instructions that when executed further cause the machine to:
divide the staging area into a spatial sequence of staging bays, each staging bay corresponds to a destination location such that goods to be delivered at a destination are placed on the corresponding staging bay.

17. The non-transitory machine readable storage medium of claim 15, having instructions that when executed further cause the machine to:
partition the route in a plurality of legs, each leg defining a segment of the route on which the good is transported on one transport;
then for all legs:
associate with each stop on the leg a unique ID, the ID being representative of a destination location on the legs the IDs having an order which is descriptive of the sequence of the destination locations on the leg; and
based on the order of the IDs, determining the first spatial sequence in which the goods are to be put down on the staging area.

18. The non-transitory machine readable storage medium of claim 17, having instructions that when executed further cause the machine to:
invert a staging order for goods inverted at an end of a leg of a route.

19. The method of claim 1, wherein the route which the vehicle will travel to deliver the goods to the destination locations is based on the plurality of delivery requests.

20. The method of claim 1, wherein creating, by the computer system, the plan for the placement of the goods on the staging area associated with the vehicle comprises:
creating the plan for the placement of the goods on the staging area prior to placing the goods on the staging area.

* * * * *

UNITED STATES PATENT AND TRADEMARK OFFICE
CERTIFICATE OF CORRECTION

PATENT NO. : 8,280,548 B2
APPLICATION NO. : 11/794112
DATED : October 2, 2012
INVENTOR(S) : Jacek Zuber, Amar Kumar and Arno D. Bruns It is certified that error appears in the above-identified patent and that said Letters Patent is hereby corrected as shown below:

On the Title Page, in Item [75], under Inventors, at line 2, delete "Wieslech" and insert --Wiesloch--.

Signed and Sealed this
Fourteenth Day of May, 2013

Teresa Stanek Rea
*Acting Director of the United States Patent and Trademark Office*